(12) United States Patent
Abrat et al.

(10) Patent No.: US 7,201,388 B2
(45) Date of Patent: Apr. 10, 2007

(54) RIGID AXLE FOR A VEHICLE, COMPRISING INTEGRATED TRAILING ARMS

(75) Inventors: Dunja Abrat, Breuna (DE); Olaf Schuette, Kassel (DE)

(73) Assignee: DaimlerChrysler AG, Stuttgart (DE)

( * ) Notice: Subject to any disclaimer, the term of this patent is extended or adjusted under 35 U.S.C. 154(b) by 374 days.

(21) Appl. No.: 10/485,797

(22) PCT Filed: Jul. 20, 2002

(86) PCT No.: PCT/EP02/08118

§ 371 (c)(1),
(2), (4) Date: Feb. 3, 2004

(87) PCT Pub. No.: WO03/018334

PCT Pub. Date: Mar. 6, 2003

(65) Prior Publication Data

US 2004/0188972 A1 Sep. 30, 2004

(30) Foreign Application Priority Data

Aug. 21, 2001 (DE) ................................ 101 40 856

(51) Int. Cl.
*B60G 9/00* (2006.01)
(52) U.S. Cl. .................... 280/124.128; 280/124.153
(58) Field of Classification Search ......... 280/124.131, 280/124.132, 124.133, 124.17, 124.128, 280/124.153, 93.512
See application file for complete search history.

(56) References Cited

U.S. PATENT DOCUMENTS

| 4,768,839 | A | | 9/1988 | Spindler |
| 4,911,417 | A | * | 3/1990 | Short ........................ 267/256 |
| 5,409,254 | A | | 4/1995 | Minor et al. |
| 5,954,351 | A | | 9/1999 | Koschinat |
| 6,059,314 | A | * | 5/2000 | Streubel et al. ............. 280/798 |
| 6,065,813 | A | * | 5/2000 | Fett et al. ................ 301/124.1 |
| 6,148,968 | A | * | 11/2000 | Davison ................. 188/206 A |
| 2005/0156462 | A1 | * | 7/2005 | Abrat et al. ............. 301/124.1 |

FOREIGN PATENT DOCUMENTS

| DE | 296 16 257 U | 12/1996 |
| DE | 100 60 312 | 1/2002 |
| FR | 2 793 736 | 11/2000 |

* cited by examiner

*Primary Examiner*—Paul N. Dickson
*Assistant Examiner*—Timothy Wilhelm
(74) *Attorney, Agent, or Firm*—Kenyon & Kenyon LLP

(57) ABSTRACT

A vehicle rigid axle includes an axle beam with axle journals or wheel carriers arranged at the ends thereof, and at least two trailing arms rigidly fixed to the axle beam. Each half of the vehicle rigid axle—viewed from the middle of the axle—includes an axle beam section, a trailing arm section and a wheel head section arranged in tandem, the wheel head section including at least one axle journal or one wheel carrier. In each case the end faces of the axle tube sections are congruent with the adjoining end faces of the trailing arm sections and their end faces are congruent with the respectively adjoining end faces of the wheel head sections, at least in some areas. The adjoining sections are in each case welded together at their end faces. The vehicle rigid axle may increase the ride comfort and driving safety and may reduce the tire wear.

9 Claims, 3 Drawing Sheets

RIGID AXLE FOR A VEHICLE, COMPRISING INTEGRATED TRAILING ARMS

FIELD OF THE INVENTION

The present invention relates to a vehicle rigid axle, which may include an axle beam with axle journals or wheel carriers arranged at the ends thereof, and at least two trailing arms rigidly fixed to the axle beam.

BACKGROUND INFORMATION

German Published Patent Application No. 296 16 257 describes a pneumatically sprung vehicle rigid axle, which includes an axle tube and trailing arms welded thereto. Trailing arms with corresponding socket holes are pushed on to the axle tube, which is formed as axle journal at each of its two ends. The trailing arms are welded to the axle tube along the socket holes. The trailing arm is extended rearwardly beyond the axle tube, where its free end serves as support for an air spring.

The extension, among other things, makes the trailing arm a component subject to flexural stress. In order to reduce any weakening of the trailing arm due to the socket holes, the cross-sectional profile of the trailing arm must be designed with relatively large dimensions. Moreover, in the area of the welds, the layers of material of the axle tube and the trailing arm are superimposed one on top of another in the radial direction of the axle tube. Such material doublings and stiffening measures have a detrimental effect on the size of the unsprung mass.

It is an aspect of the present invention to provide a vehicle rigid axle, which may increase ride comfort and driving safety and which may reduce tire wear. The construction of the axle may facilitate adaptation to different self-propelled and/or towed vehicles.

SUMMARY

The foregoing aspect may be achieved by providing a vehicle rigid axle as described herein. For this purpose, each half of the vehicle rigid axle—viewed from the middle of the axle—may include an axle beam section, a trailing arm section and a wheel head section arranged in tandem, the wheel head section including at least one axle journal or one wheel carrier. The end faces of the axle beam sections are congruent with the adjoining end faces of the trailing arm sections and their opposite end faces are congruent with the respectively adjoining end faces of the wheel head sections, at least in some areas. The adjoining sections are in each case welded together at their end faces.

Such vehicle rigid axles are used, among other things, as trailer axles for heavy commercial vehicles. The parts: axle beam section, trailing arm section and wheel head section are assembled according to track width and admissible axle load and are in each case friction welded to one another at their end faces. When assembling, it is possible in order to form an axle for a trailer, for example, the track width of which is greater than the standard track width, to use a longer trailing arm. Instead of the longer trailing arm, longer axle journals or wider trailing arm sections may be used, while leaving the frame width unchanged.

End-face welding of the sections may avoid material doubling in the weld zone. At the same time the axle weight may be reduced without sacrificing strength. Moreover, the avoidance of overlapping joints and gaps may reduce corrosion and may facilitate weld testing.

The weight reduction may reduce the unsprung axle mass, thereby among other things reducing the susceptibility of the rigid axle to trampling. The latter may improve road adhesion and hence driving safety. It also may have a positive effect on the life of the tires.

Further details of example embodiments of the present invention are described below with reference to the appended Figures.

DETAILED DESCRIPTION

Figure 1:
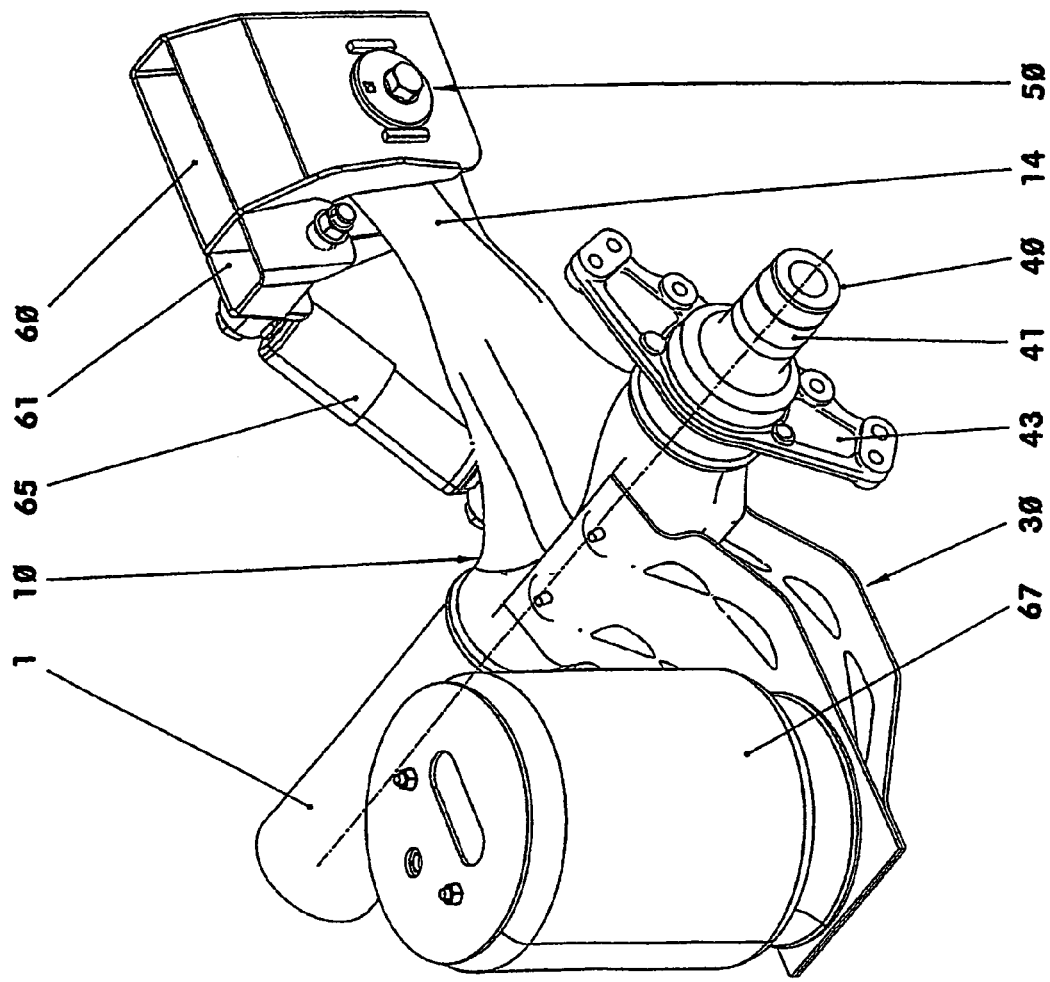
FIG. 1 is a diametric representation of an outer part of a vehicle rigid axle.
Figure 2:
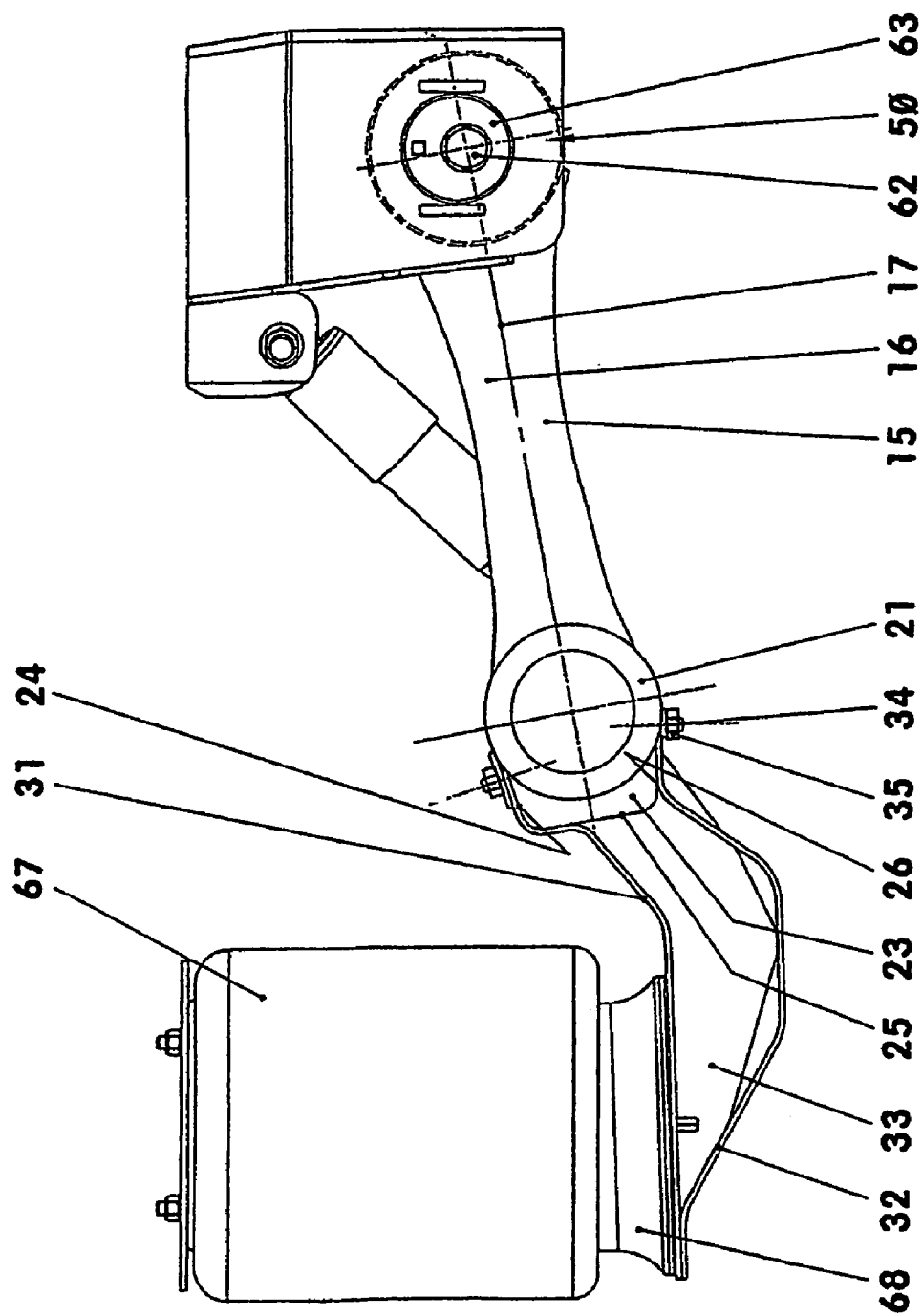
FIG. 2 is a side view of FIG. 1, but without an axle journal.
Figure 3:
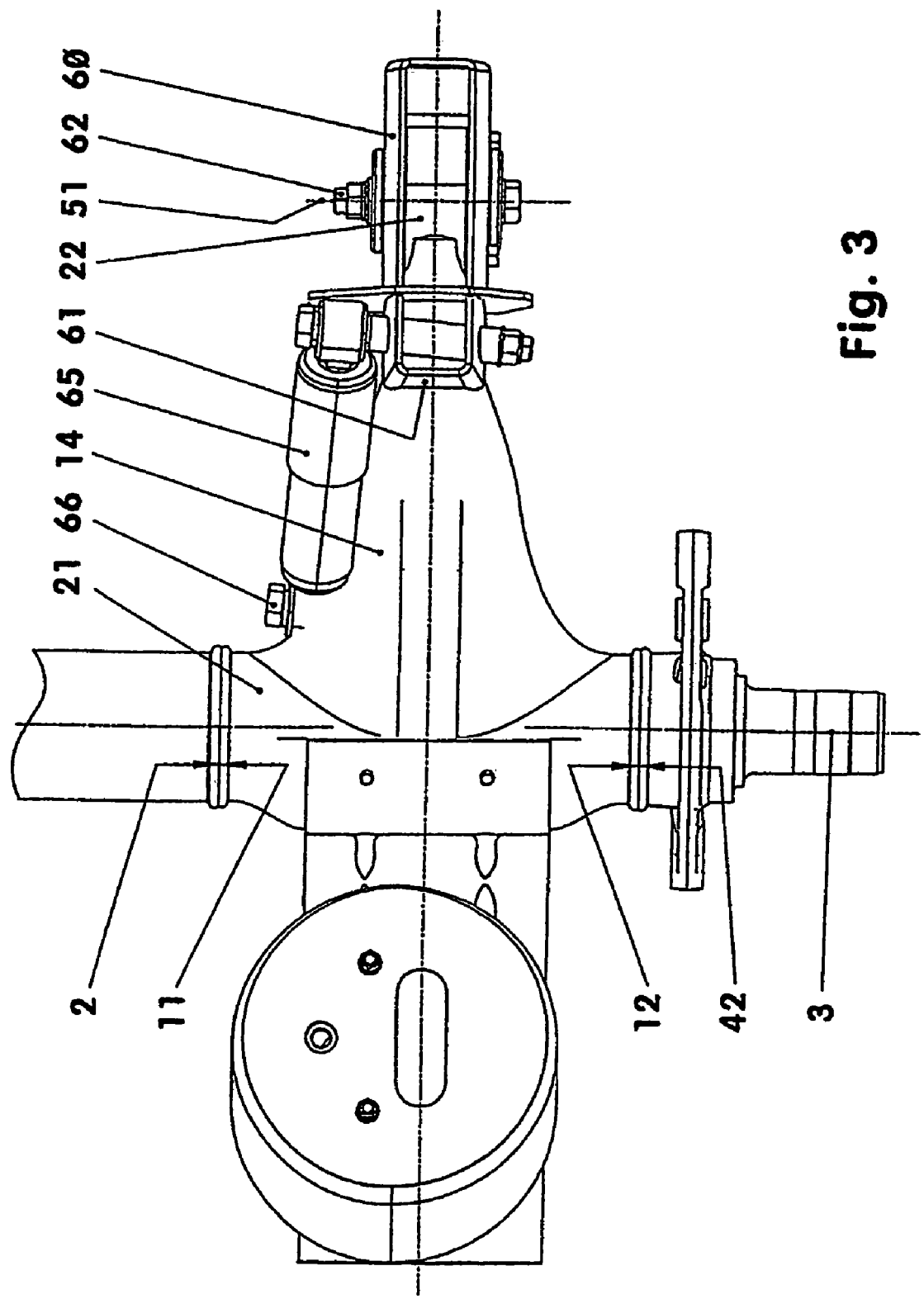
FIG. 3 is a top view of FIG. 1 with trailing arm arranged horizontal.

FIGS. 1 to 3 illustrate, by way of example, a right-hand outer area of an axle of a towed commercial vehicle trailer or semitrailer without wheel and brake.

According to FIG. 1 the axle part shown includes an axle beam section (1), a right-hand trailing arm section (10) and a wheel head section (40). At its front end—pointing in the direction of travel, for example—the trailing arm section (10) is fixed by an elastomer body in a bearing bracket (60) supported on the vehicle body side, so that it may swivel universally in an articulated bearing (50). It is braced in relation to the bearing bracket (60) by a shock absorber (65). The rear end of the trailing arm section (10) is braced on the vehicle body by an air spring (67).

The axle beam section (1) includes, for example, a smooth, cylindrical axle tube. The axle tube (1), which may also be a polygonal profile, terminates here directly on the trailing arm section (10) with a straight, plane end face (2). The end face (2) is aligned perpendicular to the center line (3) of the axle tube (1).

The trailing arm section (10) functionally includes a central element (21), a suspension link segment (14) with a joint eye (22) and a spring bracket (30). The central element (21) is of barrel-shaped design and has two, for example, open end faces (11, 12), cf. FIG. 3. Adjoining the central element (21) towards the joint eye (22) is the suspension link segment (14). Both parts (21, 14) include, for example, a lower shell (15) and an upper shell (16) formed from sheet steel. The two shells (15, 16) are, for example, of mirror symmetrical arrangement and are welded together. The weld groove is arranged in a plane, for example, which is spanned by the axle tube center line (3) and the center line (51) of the articulated bearing (50), cf. connecting line (17) in FIG. 2.

The suspension link segment (14) has a varying cross-section, for example, over its entire length, along the connecting line (17). In the area of the central element (21) it has an at least approximately elliptical cross-section, the large major axis of the ellipse arranged parallel to the axle tube center line (3). The large semi-axis is approximately 2.3 times larger than the small semi-axis. In the area of the joint eye (22) the cross-section is oval, the vertical extent being two to three times larger than the horizontal transverse extent. Between these outer areas at approximately half the shell length is a central area, which has a substantially circular cross-section.

The cross-section in the area of the central element (21) is, for example, 5.5 times larger than the cross-section in the area of the joint eye (22). The substantially circular cross-section arranged in the central area is, for example, 4.6 times smaller than the cross-section in the area of the central element (21).

On the side remote from the suspension link segment (14), the central element (21) has a so-called support lug (23), cf. FIG. 2. The latter in the plane of projection according to FIG. 2 has a trapezoidal contour with three bearing faces (24–26). Two bearing faces (24, 26) each enclose an angle of approximately 9 angular degrees with an imaginary connecting line (17), which extends between the axle tube center line (3) and the articulated bearing center line (51). The middle bearing face (25) is aligned perpendicular to the connecting line (17). The spring bracket (30) is adapted to the support lug (23), which in the cross-section illustrated in FIG. 2, for example, may also be triangular, or to its bearing faces (24–26).

As illustrated in FIG. 2, the spring bracket (30) is formed as curved I-beam. The I-beam includes an upper, sheet metal flange (31) with a shallow lunate curve, largely subjected to tensile stress, a comparable lower sheet metal flange (32) more subjected to tensile stress, and at least one central web (33), which joins the two sheet metal flanges (31, 32) at least in sections. The upper sheet metal flange (31) bears with virtually all its surface on the bearing face (24) of the support lug (23). On the middle bearing face (25) it touches only approximately the upper third. The lower sheet metal flange (32) is in extensive contact with the lower bearing face (26). Both sheet metal flanges (31, 32) carry double-rowed stiffening beads, for example, in their longitudinal direction.

The curvature of the spring bracket (30) is selected so that the upper free end terminates with a plane face, on which the U-type bellows (67) rests by a rolling piston (68). The plane face encloses an angle of approximately 10° with the connecting line (17), cf. FIG. 2.

The spring bracket (30) is fixed to the central element (21) by four threaded bolts (34) welded on between the central element (21) and the support lug (23). The nuts (35) needed for fixing, cf. FIG. 2, are illustrated in FIGS. 1 and 3.

Different types of spring brackets (30) may thus be easily connected to the suspension link segment (14).

The spring bracket (30) may also be welded or otherwise fixed to the support lug (23) and/or to the central element.

In extension of the axle tube center line (3) an axle journal (41) is arranged next to the trailing arm section (10). The journal is substantially a rotationally symmetrical part for supporting the wheel, which towards the trailing arm section (10) has an end face (42) perpendicular to the center line (3). A brake bracket flange (43) is formed on the axle journal (41) in proximity to this end face (42).

The axle tube (1), the trailing arm sections (10) and the axle pinions (41) are all aligned with one another. The axle tube (1) is butt-welded on to the inner end face (11) of the trailing arm section (10), while the axle journal (41) is butt-welded on to the outer end face (12). Friction welding, for example, is used as welding method.

Depending on the type of axle, the axle tube (1) arranged between the trailing arm sections (10) may be omitted. In this case, the inner end faces (11) of the central element (21) are welded directly to one another. If necessary, the central element is extended to the middle of the axle for this purpose.

The trailing arm section (10) is supported in the bearing bracket (60) by an elastomer body. The latter is seated in, for example, pressed into the joint eye (22). The elastomer body is fixed in the bearing bracket (60) by a bolt (62). The bolt (62) bears on the bearing bracket (60) on both sides in eccentric discs (63) between lateral stops, for adjusting the track, for example.

On the bearing bracket (60) is a rectangular solid-shaped projection (61) facing the axle. One of the two shock absorbers (65) is fitted between this projection (61) and a bolt (66) arranged in the root area of the suspension link segment (14).

LIST OF REFERENCE NUMBERS

1 Axle beam section, axle tube
2 End face
3 Center line to (1)
10 Trailing arm section, trailing arm
11 End face, inside
12 End face, outside
14 Suspension link segment
15,16 Suspension link lower and upper shell
17 Connecting line
21 Central element
22 Joint eye
23 Support lug
24,25,26 Bearing faces, top, middle, bottom
30 Spring bracket, cantilever bracket
31,32 Sheet metal flange, upper, lower
33 Web
34 Threaded bolt
35 Nuts
40 Wheel head section
41 Axle journal
42 End face
43 Brake bracket flange
50 Articulated bearing
51 Articulated bearing center line
60 Bearing bracket
61 Projection
62 Bolt
63 Eccentric disc
65 Shock absorber
66 Bolt
67 Air spring, U-shaped bellows
68 Rolling piston

The invention claimed is:

1. A vehicle rigid axle, comprising:
an axle beam;
one of axle journals and wheel carriers arranged at ends of the axle beam; and
at least two trailing arms rigidly fixed to the axle beam;
wherein each half of the vehicle rigid axle, viewed from a middle, includes an axle beam section, a trailing arm section and a wheel head section arranged in tandem, the wheel head section including at least one of at least one axle journal and at least one wheel carrier;
wherein end faces of the axle beam sections are congruent with adjoining first end faces of the trailing arm sections and second end faces of the trailing arms sections are congruent with adjoining end faces of the wheel head sections, at least in some areas; and
wherein the axle beam sections, the trailing arm sections and the wheel head sections are welded together at the end faces.

2. The vehicle rigid axle according to claim 1, wherein the end faces of the axle beam sections, the trailing arm sections and the wheel head sections are planar.

3. The vehicle rigid axle according to claim 1, wherein the end faces of the axle beam sections, the trailing arm sections and the wheel head sections are aligned parallel to a vertical central longitudinal plane of the vehicle.

4. The vehicle rigid axle according to claim 1, wherein the end faces of the axle beam sections, the trailing arm sections and the wheel head sections are friction welded.

5. The vehicle rigid axle according to claim 1, wherein adjoining end faces of the axle beam sections, the trailing arm sections and the wheel head sections form congruent pairs.

6. The vehicle rigid axle according to claim 1, further comprising an articulated bearing configured to support the trailing arm section on a vehicle body, the trailing arm section extending beyond a center line of the axle beam section.

7. The vehicle rigid axle according to claim 1, further comprising a spring-carrying cantilever bracket arranged to extend beyond a center line of the axle beam section.

8. The vehicle rigid axle according to claim 1, wherein the trailing arm section has a closed tubular profile having one of a square contour and a circular contour in a central area between an articulated bearing and a center line of the axle beam section.

9. A vehicle rigid body, comprising:
   an axle beam;
   one of axle journals and wheel carriers arranged at ends of the axle beam; and
   at least two trailing arms;
   wherein each half of the vehicle rigid axle, viewed from a middle, includes a trailing arm section and a wheel head section arranged in tandem, the wheel head section including at least one of at least one axle journal and a wheel carrier;
   wherein inner end faces and outer end faces of the trailing arm sections are congruent with adjoining end faces of the wheel head sections at least in some areas; and
   wherein the trailing arm sections and the wheel head sections are welded together at the end faces.

* * * * *

UNITED STATES PATENT AND TRADEMARK OFFICE
CERTIFICATE OF CORRECTION

| | | |
|---|---|---|
| PATENT NO. | : 7,201,388 B2 | Page 1 of 1 |
| APPLICATION NO. | : 10/485797 | |
| DATED | : April 10, 2007 | |
| INVENTOR(S) | : Abrat et al. | |

It is certified that error appears in the above-identified patent and that said Letters Patent is hereby corrected as shown below:

Title page, item (54), change "RIGID AXLE FOR A VEHICLE, COMPRISING INTEGRATED TRAILING ARMS" to --VEHICLE RIGID AXLE WITH INTEGRAL TRAILING ARMS--;

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,201,388 B2
APPLICATION NO. : 10/485797
DATED : April 10, 2007
INVENTOR(S) : Abrat et al.

It is certified that error appears in the above-identified patent and that said Letters Patent is hereby corrected as shown below:

Title page, item (54), and Column 1, lines 1-3, change "RIGID AXLE FOR A VEHICLE, COMPRISING INTEGRATED TRAILING ARMS" to --VEHICLE RIGID AXLE WITH INTEGRAL TRAILING ARMS--;

This certificate supersedes the Certificate of Correction issued November 11, 2008.

Signed and Sealed this

Ninth Day of December, 2008

JON W. DUDAS
*Director of the United States Patent and Trademark Office*